(12) United States Patent
Crum et al.

(10) Patent No.: US 6,276,230 B1
(45) Date of Patent: Aug. 21, 2001

(54) HANDLE BAR THROTTLE CONTROLLER

(75) Inventors: R. Clayton Crum, Goshen; Kevin D. Kurtz, Ft. Wayne; John Zdanys, Jr., Elkhart, all of IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/309,355

(22) Filed: May 11, 1999

(51) Int. Cl.$^7$ ............................ B62K 23/04; B62K 11/00; B62M 7/00
(52) U.S. Cl. ...................... 74/551.9; 74/504; 74/551.8; 180/170; 180/335
(58) Field of Search .................... 74/488, 491, 504, 74/510, 511 R, 523, 525, 551.1, 551.2, 551.8, 558, 551.9; 180/167, 170, 174, 178, 335

(56) References Cited

U.S. PATENT DOCUMENTS

| | | |
|---|---|---|
| 3,457,537 | 7/1969 | Hines . |
| 3,643,198 | 2/1972 | Economu . |
| 4,334,352 | 6/1982 | VanBenthuysen . |
| 4,430,634 | 2/1984 | Hufford et al. . |
| 4,435,691 | 3/1984 | Ginn . |
| 4,616,504 | 10/1986 | Overcash et al. . |
| 4,621,250 | 11/1986 | Echasseriau et al. . |
| 4,643,497 | 2/1987 | Oelsch . |
| 4,688,420 | 8/1987 | Minagawa . |
| 4,703,649 | 11/1987 | Eitoku et al. . |
| 4,841,626 | 6/1989 | Griebel . |
| 4,864,273 | 9/1989 | Tsuzuki et al. . |
| 5,039,975 | 8/1991 | Ishihara . |
| 5,043,695 | 8/1991 | Simon et al. . |
| 5,047,746 | 9/1991 | Stilwell et al. . |
| 5,133,321 | 7/1992 | Hering et al. . |
| 5,144,277 | 9/1992 | Ishihara et al. . |
| 5,222,414 | * 6/1993 | Kobayashi ................... 71/527 |
| 5,248,075 | 9/1993 | Young et al. . |
| 5,321,980 | 6/1994 | Hering et al. . |
| 5,385,068 | 1/1995 | White et al. . |
| 5,415,144 | 5/1995 | Hardin et al. . |
| 5,416,295 | 5/1995 | White et al. . |
| 5,460,035 | 10/1995 | Pfaffenberger . |
| 5,828,290 | 10/1998 | Buss et al. . |
| 6,038,923 | * 3/2000 | Lin ............................ 73/488 |
| B1 4,355,293 | 9/1985 | Driscoll . |

FOREIGN PATENT DOCUMENTS 6-56065 * 3/1994 (JP) .
6-344968 * 12/1994 (JP) .

* cited by examiner

Primary Examiner—David A. Bucci
Assistant Examiner—William C Joyce
(74) Attorney, Agent, or Firm—Mark P. Bourgeois; Mark W. Borgman

(57) ABSTRACT

A throttle controller includes an electrical position sensor having a movable element and being mounted on a steering mechanism, such as a handlebar, and a mechanical interface from the position sensor to a throttle handle. The movement of the throttle handle actuates the mechanical interface which, in turn, alters the position of the movable element in the position sensor. The changeable position of the movable element thus provides an electrical indication of the position of the throttle handle suitable for controlling the internal combustion engine or electric motor. The position sensor may be a rotary position sensor having a rotor as the movable element, wherein rotating the throttle handle rotates the rotor. The throttle controller is particularly useful on a personal water craft, all-terrain vehicles, motorcycles, etc. Potentiometers or Hall effect devices are both suitable for use as the position sensor.

13 Claims, 5 Drawing Sheets

HANDLE BAR THROTTLE CONTROLLER

BACKGROUND OF THE INVENTION

1. Field of the Invention

This invention relates to the field of throttle controllers. More specifically, the invention relates to a throttle controller with a rotary position sensor for controlling an engine, motor, or powered vehicle, whether internal combustion (IC), electric, or otherwise.

2. Description of the Related Art

A wide variety of devices and methods exist that are related to position sensors. A few examples of patents related to position sensors are as follows, each of which is herein incorporated by reference for its pertinent and supportive teachings:

U.S. Pat. No. 5,828,290 is a modular position sensor;

U.S. Pat. No. 5,460,035 is a bearing free spring free throttle position sensor;

U.S. Pat. No. 5,416,295 is a combined pedal force switch and position sensor;

U.S. Pat. No. 5,415,144 is a throttle position validation method and apparatus;

U.S. Pat. No. 5,385,068 is an electronic accelerator pedal assembly with pedal force sensor;

U.S. Pat. No. 5,321,980 is an integrated throttle position sensor with independent position validation sensor;

U.S. Pat. No. 5,133,321 is an integrated throttle control and idle validation sensor;

U.S. Pat. No. 5,047,746 is a potentiometer wiper assembly;

U.S. Pat. No. 5,039,975 is a resistor substrate for a variable resistor employed in a throttle sensor;

U.S. Pat. No. 4,703,649 is a throttle valve opening sensor;

U.S. Pat. No. 4,688,420 is a throttle valve position detecting device for a vehicle engine;

U.S. Pat. No. 4,621,250 is a rotary potentiometer, particularly for measuring angular position;

U.S. Pat. No. 4,616,504 is a throttle position sensor with a potentiometer modular that fits into a connector casing;

U.S. Pat. No. 4,435,691 is a dual track resistor element having nonlinear output;

U.S. Pat. No. 4,430,634 is a rotary potentiometer with molded terminal package;

U.S. Pat. No. 4,334,352 is a method of making of a variable resistance control; and U.S. Pat. No. 3,643,198 is a linear displacement transducer system.

The foregoing patents reflect the state of the art of which the applicant is aware and are tendered with the view toward discharging applicants' acknowledged duty of tender in disclosing information that may be pertinent in the examination of this application. It is respectfully stipulated, however, that none of these patents teach or render obvious, singly or when considered in combination, the applicants' claimed invention.

In the control of motors and machinery there are a number of interfaces that have been proposed through the years. These interfaces have sought to ease an operator's ability to perform the functions required in the operation of the machines with as little extraneous action and hardware as possible. In this way, an operator may perform as many functions as possible with minimal hindrance and with maximum control to maximize safety and efficiency.

One possible way of controlling recreational machines, such as personal water craft, all-terrain vehicles, and motorcycles, uses a twist-grip mechanism as an interface to the engine throttle via a complex set of mechanical linkages and cables. This method of transmitting the driver's input at the handlebar of the vehicle to the throttle plate on the engine carburetor is expensive, is prone to mechanical failure due to physical damage or corrosion, and is not directly compatible with modern electronic fuel injection (EFI) or electronic engine control systems.

There is much effort to improve the efficiency of internal combustion engines and electric motors on such vehicles, and similarly, to reduce the emissions, or pollutants, that are produced directly or indirectly by these engines and motors. A vital part of better efficiency and reduced emissions is the electronic control circuitry used with the engines and motors. The electronic circuitry monitors various parameters and provides feedback or controls to the engine or motor. The feedback may be a signal which in some way improves efficiency or reduces emissions. The signal may, for example, be used to control the amount of fuel injected into the engine or the timing of ignition sparks.

One component of such electronic circuitry often includes a potentiometer used to sense the position of the throttle valve. This potentiometer is in some ways similar to the volume controls used in radio and television receivers. A voltage is applied across the extreme ends of a resistor. An intermediate tap is provided between the two extreme ends of the resistor. The tap is mechanically linked to the device which is to be sensed, such as the throttle valve, and the position of the device is determined by the voltage at the intermediate tap. Thus, a precise position of a throttle valve may be determined by linking it to a potentiometer mounted on the engine. Once the position is known, other adjustments may be made to control the engine at a higher efficiency.

With electronics becoming more prevalent in automatic engine controls, the ability for driver to interface with engine functions directly from electronic controllers is more desirable. As mentioned above, the complex set of mechanical linkages and cables in recreational machines for controlling a throttle plate does not provide such an interface, even though a potentiometer may be provided as a throttle valve position sensor. Therefore, there existed a need to provide a way to overcome the limitations of conventional throttle controllers and offer a throttle control that can interface directly with electronic engine controls. Otherwise, a limitation will always exist to the efficiencies that may be obtained from such machines.

BRIEF SUMMARY OF THE INVENTION

According to the present invention, a throttle controller is provided comprising an electrical position sensor suitable for mounting on a steering mechanism of a powered vehicle, the position sensor having a movable element and a mechanical interface from the position sensor to a throttle handle, wherein movement of the throttle handle actuates the mechanical interface which, in turn, alters the position of the movable element in the position sensor, providing an electrical indication of the position of the throttle handle suitable for controlling the powered vehicle.

By way of example, the position sensor may be a rotary position sensor having a rotor as the movable element, wherein rotating the throttle handle rotates the rotor. The steering mechanism may be a handlebar, such as that found on a personal water craft, all-terrain vehicle, or motorcycle, and the position sensor may be a potentiometer or magnet and Hall effect device. Accordingly, the vehicle may be a personal water craft, all-terrain vehicle, motorcycle, snow blower, and the like. Also for example, the mechanical interface may be a twist-grip mechanism or it may be a link between the throttle handle and a spring-loaded rotor inside the position sensor housing. In particular, the throttle handle may be a cylindrical grip or a thumb lever. Thus, with these structures in mind, the present invention provides a way to eliminate mechanical linkages and cables and offers a throttle control that can interface directly with electronic engine controls.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE INVENTION

According to a preferred embodiment of the present invention, a throttle controller includes an electrical position sensor having a movable element and being mounted on a steering mechanism, such as a handlebar, and a mechanical interface from the position sensor to a throttle handle. The movement of the throttle handle actuates the mechanical interface which, in turn, alters the position of the movable element in the position sensor. The changeable position of the movable element thus provides an electrical indication of the position of the throttle handle suitable for controlling the internal combustion engine or electric motor. Preferably, the position sensor is a rotary position sensor having a rotor as the movable element, wherein rotating the throttle handle rotates the rotor. More preferably, the steering mechanism is a handlebar, such as that found on a personal water craft, all-terrain vehicle, or motorcycle. Most preferably, the position sensor is a potentiometer, but may alternatively be a magnet and Hall effect device.

One conventional way of controlling recreational machines, such as personal water craft, all-terrain vehicles, motorcycles, snow blowers, and the like, uses a twist-grip mechanism as an interface to the engine throttle via a complex set of mechanical linkages and cables. This method of transmitting the driver's input at the handlebar of the vehicle to the throttle plate on the engine carburetor is expensive, is prone to mechanical failure due to physical damage or corrosion, and is not directly compatible with modern electronic fuel injection (EFI) or electronic engine control systems. Due to the variety of moving parts, more defects are possible, such as kinks in the cables, etc. By contrast, electric wires are less expensive, prove to develop fewer defects, and have no moving parts. Thus, they provide a more reliable indication of the position of the throttle handle suitable for controlling the engine or motor.

A variety of mechanical interfaces and throttle handles are provided by the present invention to create the features and advantages indicated herein for personal water craft, all-terrain vehicles, motorcycles, snow blowers, and other powered vehicles and machinery to which the invention may be adapted. A major advantage is the elimination of mechanical linkages and cables and the offering of a throttle control that can interface directly with electronic engine controls.

Figure 1:
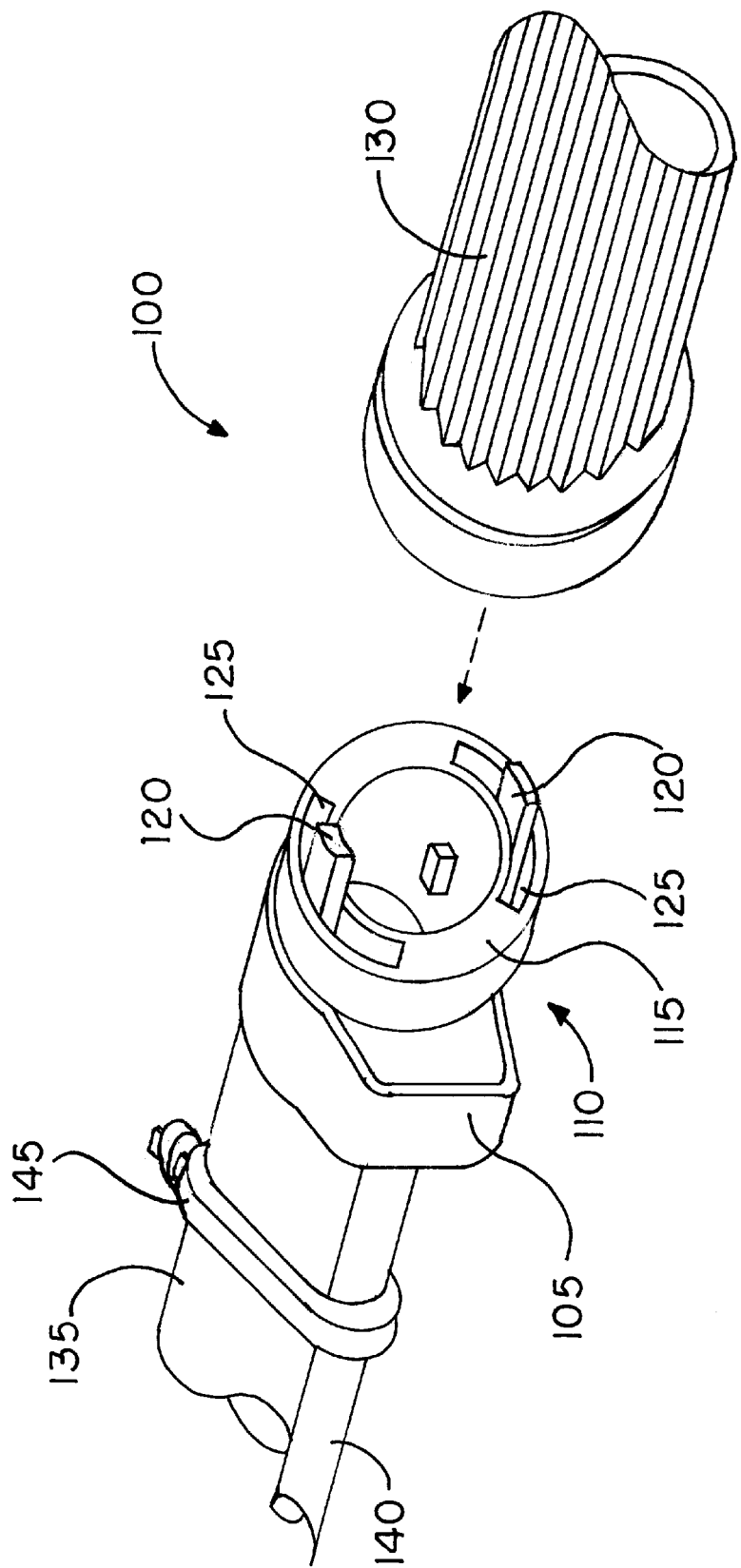
FIG. 1 is a perspective view of a throttle controller according to a preferred embodiment of the present invention.

Referring to the figures, FIG. 1 shows a throttle controller 100 according to a preferred embodiment of the present invention. Throttle controller 100 includes a rotary position sensor 105 attached to handlebar 135 used as a steering mechanism for a vehicle powered by an internal combustion engine or electric motor. Although not shown in FIG. 1, position sensor 105 includes a rotor similar in concept to rotor 16 shown in FIG. 4. That is, the rotor in position sensor 105 enables production of an electrical indication of the rotor position. Alternatively, the rotor inside position sensor 105 may be any other type of rotor known to those skilled in the art that may be used in position sensors, such as potentiometers, Hall effect devices, etc. FIG. 1 also shows a twist-grip mechanism 110 attached to position sensor 105 and a throttle handle 130 in position to be attached to twist-grip mechanism 110. Essentially, twist-grip mechanism 110 operates as a mechanical interface between throttle handle 130 and position sensor 105 such that rotation of throttle handle 130 actuates twist-grip mechanism 110 by rotating it and, in turn, rotating the rotor inside position sensor 105. Thus, when throttle handle 130 is rotated, so is the rotor in position sensor 105. Because it is possible for a position sensor, such as position sensor 105, to yield an electrical indication of the rotor position, throttle controller 100 may be used for controlling an engine or motor.

If position sensor 105 is a potentiometer, then an electrical lead 140 may be used to pass a current through position sensor 105, sensing the position of the rotor depending upon the resistance detected inside position sensor 105. A tie down 145 is provided to secure electrical lead 140 to handlebar 135. As the rotor position is changed, the resistance detected will also change. This change in resistance may be used by electronic engine controls to increase and decrease fuel flow to the engine in an analogous manner to that used by conventional twist-grip mechanisms. Such conventional twist-grip mechanisms on vehicles such as motorcycles use a complex set of mechanical linkages and cables between a throttle handle and a throttle-plate on the engine carburetor.

Twist-grip mechanism 110 shown in FIG. 1 provides the mechanical interface between throttle handle 130 and position sensor 105 by virtue of prongs 120 extending from a hub (not shown) inside housing 115. In a similar fashion to conventional twist-grip mechanisms with mechanical linkages and cables, the hub inside housing 115 is spring loaded and preferably rides on bearings, although bearings are considered optional. Because the hub is spring loaded, a rotating force may be applied to throttle handle 130 to accelerate the engine or motor and, when the rotating force is removed, throttle handle 130 will return to its original position, reducing the engine or motor speed to idle. Prongs 120 extend from the hub through slots 125 formed in housing 115. Slots 125 provide a mechanical limit to the extend of rotation of throttle handle 130. Also, although not shown in FIG. 1, complementary sockets are provided in throttle handle 130 to receive prongs 120, such that rotation of throttle handle 130 causes rotation of prongs 120 and the hub inside housing 115, along with the rotor of position sensor 105. FIG. 1 does not show the particular type of link between the hub inside housing 115 and the rotor inside position sensor 105, however, any type of link known to those skilled in the art may be used. Even though throttle controller 100 is shown in association with handlebar 135, throttle controller 100 may be used on a wide variety of steering mechanisms, perhaps even on a steering mechanism of a vehicle powered by other than an internal combustion engine. For example, throttle controller 100 might be used on a battery powered vehicle. Also, the internal combustion engine may be of the type using for fuel either motor gasoline, diesel, natural gas, ethanol, other fossil fuels, etc.

Figure 2:
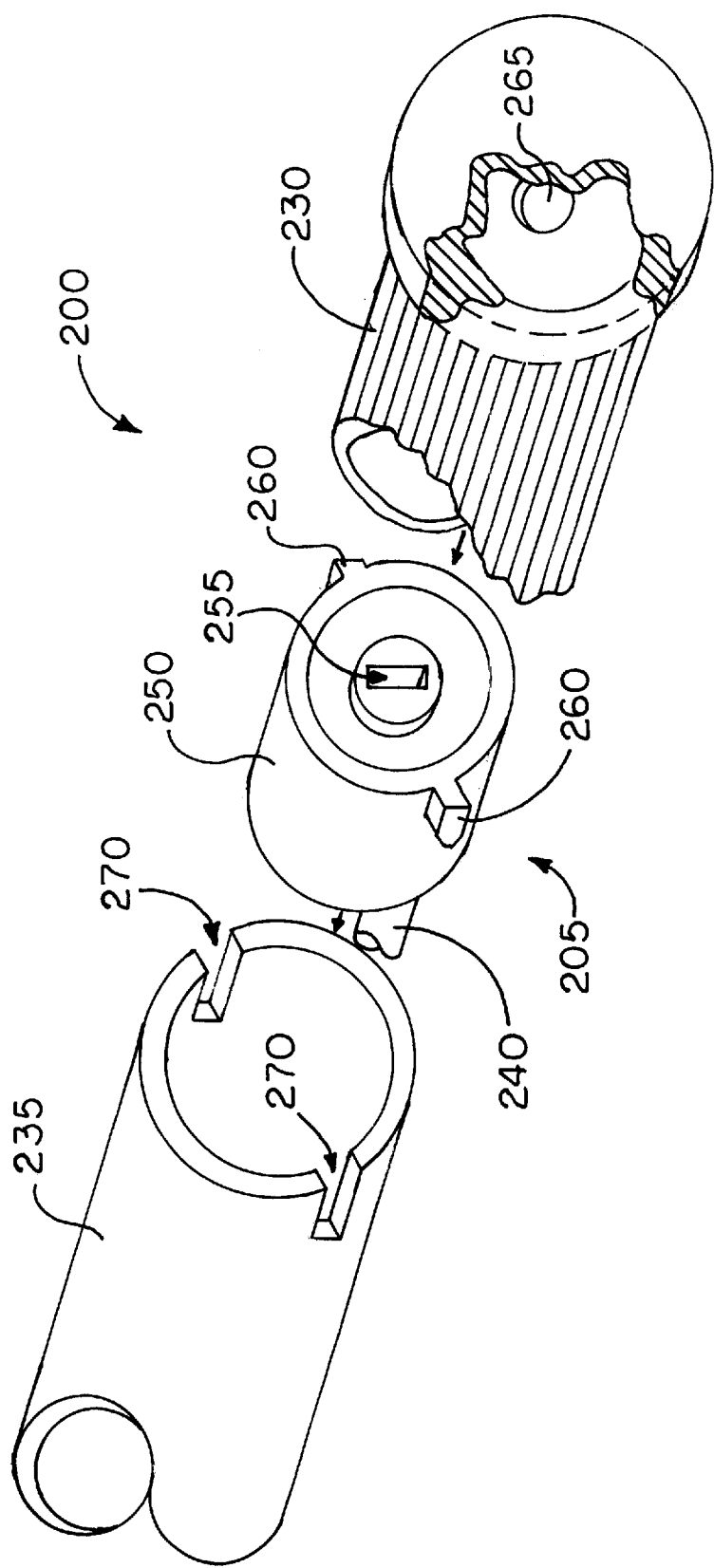
FIG. 2 is a perspective view of a second throttle controller according to a preferred embodiment of the present invention.

Turning now to FIG. 2, an alternative preferred embodiment of the present invention, namely, throttle controller 200, is shown in an exploded view with a portion of a throttle handle 230 cut away to show details of the invention. Throttle controller 200 includes a rotary position sensor 205 mounted inside a handlebar 235 and throttle handle 230 slipped over handlebar 235 to make mechanical contact with position sensor 205. While it is preferred that position sensor 205 is inserted fully into handlebar 235, only partial insertion of position sensor 205 is within the present invention. Similarly, it is conceivable that various changes may be made in the shape, dimensions, and interconnections between handlebar 235, position sensor 205, and throttle handle 230 while retaining the basic features and advantages of throttle controller 200 in accordance with the description herein.

Notably absent from throttle controller 200 in FIG. 2 is twist-grip mechanism 110 of throttle controller 100 shown in FIG. 1. Twist-grip mechanism 110 is absent because its elements have been incorporated into position sensor 205. Accordingly, although not shown in FIG. 2, position sensor 205 includes a rotor, a spring, and preferably bearings inside housing 250, but bearings are considered optional. The rotor in position sensor 205 provides similar features to those discussed above for the rotor in position sensor 105. Thus, the spring provides a spring return force and the bearings provide smooth rotation of throttle handle 230. Position sensor 205 is also shown with a socket 255 and tabs 260. Socket 255 is complementary to prong 265 extending from the internal face of the closed end of throttle handle 230. Throttle handle 230 is essentially a hollow cylinder of sufficient size and diameter to allow insertion of handlebar 235 and position sensor 205 to a sufficient extent that prong 265 will register inside socket 255, thus establishing a mechanical interface between throttle handle 230 and position sensor 205. Prong 265 and socket 255 may be shaped and sized in a variety of other ways and still fulfill the requirements of the present invention. Tabs 260 are similarly sized and positioned to allow position sensor 205 to occupy a stationary position inside the hollow portion of handlebar 235 by registering with slots 270. An electrical lead 240 is also included to provide the ability to sense an electrical indication of the position of the rotor in position sensor 205.

Accordingly, throttle controller 200 provides a spring-loaded rotor riding on bearings inside housing 250 and a mechanical interface between throttle handle 230 and position sensor 205, such that the spring provides a return force upon rotation of the rotor by throttle handle 230. Although position sensor 205 is described as including a spring and bearings, it is conceivable that other internal mechanisms may be used for accomplishing the same objectives. Any such internal mechanisms known to those skilled in the art may thus be substituted in the place of a spring or bearings. One example of a bearing-free rotary position sensor is provided in U.S. Pat. No. 5,460,035 issued to Pfaffenberger, which was incorporated herein by reference above.

Figure 3:
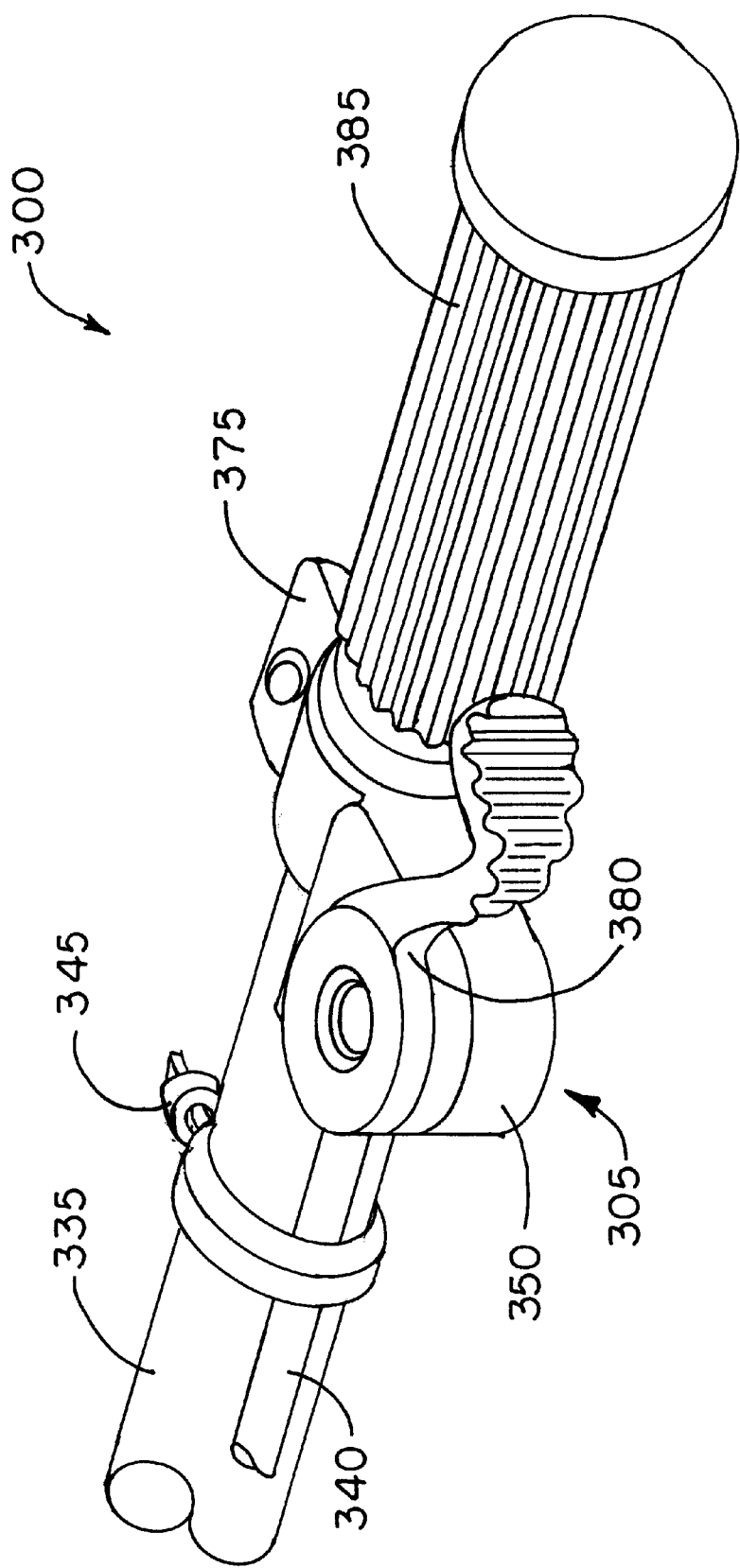
FIG. 3 is a perspective view of a third throttle controller according to a preferred embodiment of the present invention.

As shown in FIG. 3, the present invention includes yet another alternative preferred embodiment as a throttle controller 300. Throttle controller 300 includes a rotary position sensor 305 mounted to a handlebar 335. Position sensor 305 includes a housing 350 adapted to being mounted on handlebar 335 and to having a spring-loaded rotor inside the housing. A clamp mechanism 375 is also provided as part of the adaptation for mounting position sensor 305 on handlebar 335. Clamp mechanism 375 may be an unitary part of housing 350, as shown in FIG. 3, or may be a separate device used to attach housing 350 to handlebar 335. Position sensor 305 is essentially the same as position sensor 205 and 105, however, the rotational axis of the rotor inside housing 350 is orientated transverse to the longitudinal axis of handlebar 335, rather than parallel to the longitudinal axis of a handlebar as shown in FIGS. 1 and 2. Position sensor 305 is thus orientated so that thumb lever 380 may be provided in a position convenient to the operator of a vehicle of which handlebar 335 is a part. In throttle controller 300, the throttle handle is thus a thumb lever instead of a cylindrical grip as in throttle controller 100 and 200.

Thumb lever 380 is mechanically interfaced to the spring-loaded rotor inside housing 350 such that applying a force to the portion of thumb lever 380 extending away from housing 350 will rotate thumb lever 380 about the mechanical interface and simultaneously rotate the rotor inside housing 350 about its rotational axis. As described above, rotation of the rotor changes the electrical indication yielded by position sensor 305 and such indication may be used to control an internal combustion engine or other device consistent with the above discussion. An electrical lead 340 is provided to electrically interface position sensor 305 with the engine or motor (not shown) and tie down 345 is provided to secure electrical lead 340 to handlebar 335. In addition, a grip 385 is provided on the end of handlebar 335 such that an operator may conveniently grasp grip 385 for steering the vehicle while extending a thumb to simultaneously contact thumb lever 380 and conveniently control the engine or motor speed. The rotor inside position sensor 305 is spring-loaded as discussed above for position sensor 205, such that a spring return force will move the rotor and thumb lever 380 back to a position corresponding to an idle speed of the engine or motor when the applied force is removed from thumb lever 380. Because grip 385 is not rotated to control engine or motor speed as indicated for throttle controller 200 and 100, bearings inside position sensor 305 are less important in this embodiment. In the embodiment of FIGS. 1 and 2, such bearings may ensure smooth rotation of the rotor in position sensor 205 and 105, but it is not necessary for position sensor 305 to possess as robust of a design.

Referring to the three exemplary embodiments shown in FIGS. 1 to 3, it will be important for most applications of the invention to provide water and/or moisture protection to position sensor 105, 205, and 305. For each embodiment, such moisture protection may take several forms, depending upon the type of vehicle and its use, as well as the desired configuration for interfacing the throttle handle to the rotary position sensor. Accordingly, any design in accordance with the knowledge of those skilled in the art may be used which provides the necessary protection from water and/or moisture damage or interference in the rotary position sensor.

Further, the present invention includes a variety of alternative designs for the mechanical interface between each throttle handle, such as throttle handle 130, throttle handle 230, and thumb lever 380, and each respective rotary position sensor. In the embodiment of FIG. 1, the mechanical interface provides a spring return force, and preferably bearings, for throttle controller 100. By comparison, the mechanical interface of the embodiments shown in FIGS. 2 and 3 is a simple mechanical link between throttle handle 230 or thumb lever 380, respectively, and the rotor inside the associated rotary position sensor. Thus, the prong 265 and socket 255 arrangement of FIG. 2 provides the needed interface for that embodiment. A similar arrangement or alternative arrangement may be used in the embodiment of FIG. 3 to analogously link thumb lever 380 to the rotor of position sensor 305.

Also, the state of the art is such that a wide variety of designs for a position sensor may be used in keeping with the present invention. For example, the present invention is compatible with both potentiometers and Hall effect devices, among other position sensors adapted to yielding an electrical indication of position. Although it is preferred that the position sensor be of a rotary type, it is not required. Because conventional throttle controllers with mechanical linkages and cables operate by rotation of a throttle handle, there is an advantage to using the same type of operator motion in the present invention. Since the throttle handle rotates, it is convenient to mechanically interface it with a rotary position sensor. Nevertheless, other types of position sensors could be used with rotary throttle handles or even non-rotary throttle handles. Such other types of position sensors may include linear position sensors or other non-rotary position sensors. In the event that a non-rotary position sensor is used, the term "rotor" as discussed herein may not directly apply. Nevertheless, some kind of equivalent movable element will exist in the non-rotary position sensor, wherein altering the position of the movable element will produce an electrical indication of the position of a throttle handle. Springs and/or bearings, or equivalent structural features, may also be used in non-rotary position sensors to provide a return force and smooth movement of the throttle handle. Further, within the area of potentiometers or Hall effect devices individually there are further variations in design that may be used in the present invention as known to those skilled in the art, such as the variations partially discussed in the patents listed previously that are incorporated herein by reference.

Figure 4:
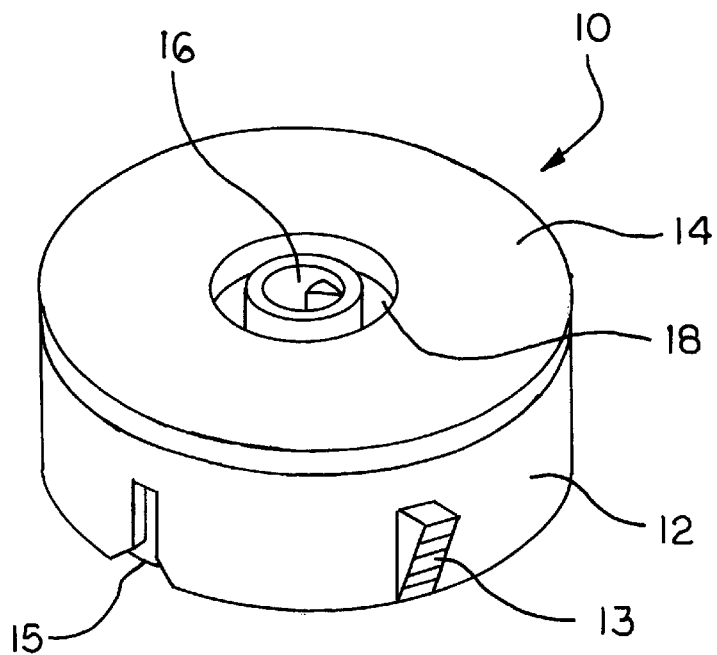
FIG. 4 is a perspective view of the top of a modular position sensor.
Figure 5:
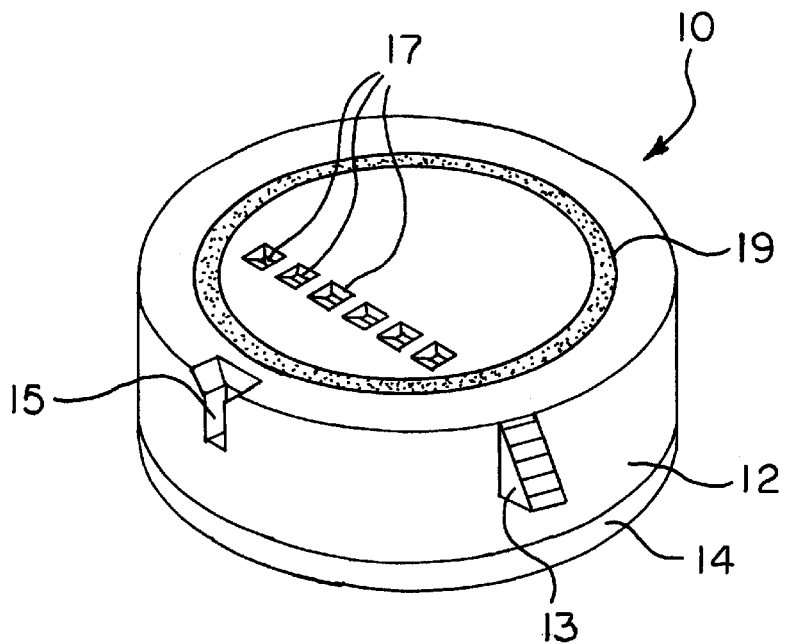
FIG. 5 is a perspective view of the bottom of the position sensor in FIG. 4.
Figure 6:
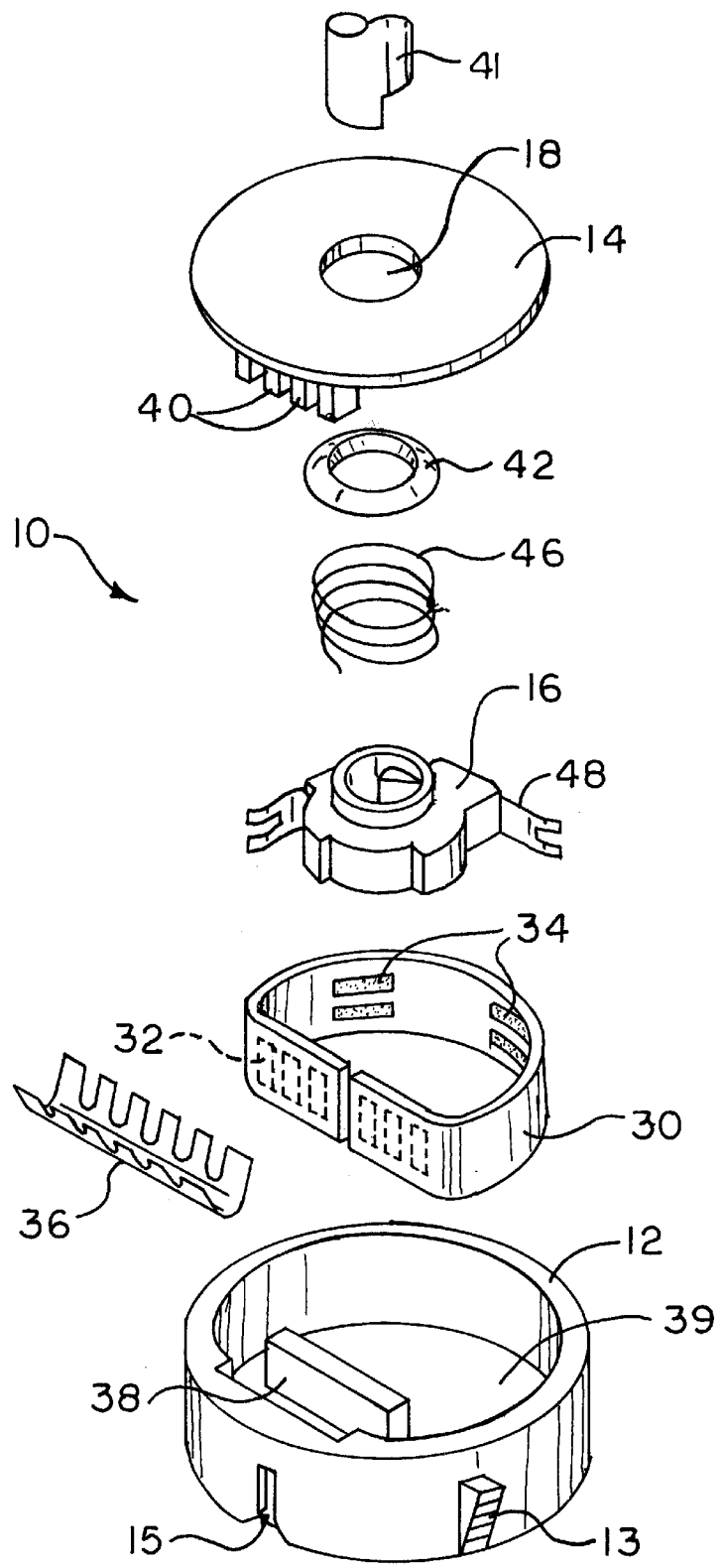
FIG. 6 is an exploded perspective view of the position sensor in FIG. 4.

Turning now to FIGS. 4 to 6, an exemplary embodiment of a rotary position sensor is shown therein. Such a position sensor is described in U.S. Pat. No. 5,828,290 to Buss, et al. incorporated herein by reference as indicated above. In FIG. 4 a perspective view of a sensor unit 10 is provided showing a housing 12, a cover 14 forming a top side of sensor unit 10, a rotor 16, a hole 18, an alignment notch 15, and snap tab 13. In FIG. 5, a perspective view is provided of a bottom side of sensor unit 10 shown in FIG. 1 additionally illustrating an elastic seal 19 and pin alignment holes 17 for electrically connecting sensor unit 10 to an electrical lead, such as electrical lead 140, 240 or 340.

FIG. 6 provides an exploded perspective view of the major components of sensor unit 10 shown in FIGS. 4 and 5. Specifically, sensor unit 10 additionally comprises a seal 42, a spring 46, electrical contactor conductive wiper blades 48 on rotor 16, a flexible film 30, output pads 32, resistance elements and/or traces 34 that couple to pads 32, a pressure element 36, a pressure wall 38, and base 39 forming a bottom side of sensor unit 10. Additionally, there is illustrated a shaft 41 that is a part of a mechanical interface in accordance with the preferred embodiments of the present invention discussed in FIGS. 1 to 3 or as may be apparent to one of ordinary skill in the art after disclosure of the present invention. Shaft 41 is shaped to securely fit through hole 18 and into rotor 16.

One of ordinary skill in the art of designing and using position sensors will realize many advantages from studying and using the preferred embodiment shown in FIGS. 4 to 6. For example, it is well understood that hole 18 could snugly fit around the portion of rotor 16 that extends up into hole 18 to provide a water/moisture/dust seal. One skilled in the art would also know that seal 19 is used to prevent external contamination, like dust or moisture, from entering pin holes 17 when sensor unit 10 is inserted into a connector unit (not shown). Such a connector unit receives sensor unit 10 and couples it to external electrical wires (not shown). Further, one skilled in the art would know that pin alignment holes 17 may be used for coupling sensor unit 10 to external electrical wires (not shown) for directing power to the sensor and for directing position sensor signals to appropriate devices. Also, instead of pin alignment holes 17 male electrical contacts for coupling to external wires may be provided.

An additional variation of the invention contemplates the use of applying any type base material 30 to support the resistive elements and/or traces 34, for example any suitable metal, Kapton material, polyamide material, plastic, etc.

Although the preferred embodiment depicts a certain shaped film 30, many variations are possible. For example, all of the outputs could be at one end of the material 30, and the slit separating the two ends could be positioned in another location. Additionally, it is even contemplated to place the resistive element and/or traces 34 in different locations, such as on the bottom side of the cover 14 or the top surface of base wall 39. Of course, this would require a different shaped rotor 16 and other elements.

Even though the preferred embodiment describes placing the pressure wedge 36 next to pressure wall 38, it is contemplated to reverse the wedge and pin locations as defined by pin alignment holes 17. Then, such pins (not shown) would be inserted between pressure wedge 36 and pressure wall 38 rather than between pressure wedge 36 and housing 12 as shown. Of course, film 30 and pin holes 17 would need to be similarly relocated.

Even the round shape of the sensor unit can be changed to most any shape, for example, oval, square, etc. Also, there is illustrated a seal 17 located around the periphery of the entire sensor unit 10. However, it is contemplated to have only the pin hole 17 areas circumscribed by a seal 19. Additionally, other materials could be used for the material of seal 17 like epoxy, glue, resins, O-rings, or resilient material. Also, seal 17 may be considered optional and not used on selected sensor units.

Even though the preferred embodiment shows a pressure wall 38, artisans could use most any structure that would support pressure to be applied to pressure devices 36, which can also be most any shape and still force film 30 against a pin inserted through pin alignment holes 17.

It is illustrated to have film 30 pressed against pins by pressure device 36. However, it is equally contemplated to have other arrangements that would still provide electrical contact between the output pads 32 and pins. For example, pressure element 36 could serve as electrical connection between the pins and the flexible film 30. Of course, a skilled artisan realizes that film 30 has to be placed next to pressure wall 38 to allow a metal pressure element 36 to directly contact pins. Additionally, a skilled artisan would also know that pressure element 36 should be divided into single identical pieces to provide proper electrical connection.

According to a preferred embodiment of the present invention, a method is also provided for controlling an engine or motor using one of the various apparatus described above. Such a method first includes mounting a throttle handle on the steering mechanism of a vehicle powered by an engine or motor, wherein the throttle handle is mechanically interfaced to a rotary position sensor and the position sensor is, in turn, electrically interfaced to the engine or motor. Notably, such a throttle handle may include throttle handle 130, throttle handle 230, thumb lever 380, and other throttle handles in keeping with the principles of the present invention. Also, the rotary position sensor may be selected from those discussed herein and other position sensors providing control of an engine or motor as described for the present method. Next, the method includes moving the throttle handle to actuate the mechanical interface, and in turn, alter the position of a rotor of the position sensor. The position change of the rotor provides the ability to obtain an electrical indication of the position of the throttle handle through the electrical interface to the engine or motor. Preferably, the step of moving the throttle handle comprises rotating the throttle handle to rotate the rotor of the position sensor.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation. Similarly, unless otherwise specified, any sequence of steps of the method indicated in the drawings or herein are given as an example of a possible sequence and not as a limitation. For example, it will be understood that, while various of the conductors (connections) are shown in the drawing as single lines, they are not so shown in a limiting sense, and may comprise plural conductor (connections), as is understood in the art.

We claim:

1. A throttle controller comprising:
    a) an electrical position sensor suitable for mounting inside a steering member of a powered vehicle, the position sensor having a movable element;
    b) a mechanical interface from the position sensor to a throttle handle, said position sensor having a peripheral surface, with at least one alignment member extending radially outward from said peripheral surface, wherein movement of the throttle handle actuates the mechanical interface which, in turn, alters the position of the movable element in the position sensor, providing an electrical indication of the position of the throttle handle suitable for controlling the powered vehicle; and
    c) receiving means on said steering member for receiving said at least one alignment member of said position sensor.

2. The throttle controller of claim 1, wherein the position sensor comprises a rotary position sensor, the movable element comprises a rotor, and rotation of the throttle handle actuates the mechanical interface which, in turn, rotates the rotor of the position sensor.

3. The throttle controller of claim 2, wherein the steering member comprises a handle bar.

4. The throttle controller of claim 3, wherein the position sensor comprises a potentiometer.

5. The throttle controller of claim 3, wherein the throttle handle comprises a twist-grip mechanism.

6. The throttle controller of claim 3, wherein the position sensor comprises:
    a housing sized to be inserted into a sleeve formed by one end of the handlebar;
    a spring-loaded rotor riding on a surface inside the housing; and
    a socket in the rotor, wherein the spring provides a return force upon rotation of the rotor.

7. The throttle controller of claim 6, wherein the throttle handle comprises a substantially hollow cylindrical grip having an open end, a closed end, and a prong extending from an internal face of the closed end, wherein the open end of the grip is sized to receive the one end of the handlebar so the prong may be inserted into the rotor socket, thus establishing a mechanical interface.

8. The throttle controller of claim 3, wherein the position sensor comprises:
    a housing suitable for mounting to the handlebar; and
    a spring-loaded rotor inside the housing.

9. A throttle controller, for mounting on a throttle handle of a tubular steering member of a vehicle that is powered by an internal combustion engine, said throttle controller comprising:
    a) a position sensor, having a substantial portion mounted inside the tubular steering member for determining the position of the throttle handle to thereby control the engine;
    b) a mechanical interface between the position sensor and the throttle handle;
    c) an alignment device extending from said position sensor to operationally engage said steering member; and
    d) a receiving device in said steering member to receive said alignment device.

10. The throttle controller of claim 9, wherein the steering member comprises a handle bar.

11. The throttle controller of claim 9, wherein the throttle handle comprises a cylindrical grip.

12. The throttle controller of claim 9, wherein the position sensor comprises a potentiometer.

13. The throttle controller of claim 10, wherein the position sensor comprises:
    a housing sized to be inserted into a sleeve formed by one end of the handlebar;
    a spring-loaded rotor riding on a surface inside the housing; and
    a socket in the rotor, wherein the spring provides a return force upon rotation of the rotor;
and wherein the throttle handle comprises:
    a substantially hollow cylindrical grip having an open end, a closed end, and a prong extending from an internal face of the closed end, wherein the open end of the grip is sized to receive the one end of the handlebar so the prong may be inserted into the rotor socket, thus establishing a mechanical interface.

* * * * *